United States Patent [19]

Miller

[11] 4,073,345
[45] Feb. 14, 1978

[54] DISC HARROW WHEEL LOCK-DOWN WITH DEPTH CONTROL ADJUSTMENT STRUCTURE

[76] Inventor: Maurice E. Miller, Stratton, Nebr. 69043

[21] Appl. No.: 768,202

[22] Filed: Feb. 14, 1977

[51] Int. Cl.$^2$ ............................................. A01B 63/22
[52] U.S. Cl. ..................................... 172/413; 92/13.8; 92/23; 172/466; 280/43.23
[58] Field of Search ............... 172/240, 315, 316, 327, 172/328, 396, 413, 466, 485, 491, 668; 280/43.23; 305/10; 188/67; 74/526, 586; 92/13, 13.4, 13.41, 13.7, 13.8, 15, 23

[56] References Cited

U.S. PATENT DOCUMENTS

| | | | |
|---|---|---|---|
| 2,939,539 | 6/1960 | Kramer | 172/396 |
| 2,994,544 | 8/1961 | Wolf | 280/43.23 |
| 3,008,772 | 11/1961 | Helsel, Sr. | 305/10 |
| 3,177,976 | 4/1965 | Wenzel | 188/67 |
| 3,260,315 | 7/1966 | Day | 172/413 |
| 3,809,165 | 5/1974 | Miller | 172/328 |
| 3,905,279 | 9/1975 | Yadon | 92/13.8 |
| 3,982,648 | 9/1976 | Luedtke et al. | 92/23 X |
| 4,039,093 | 8/1977 | Schmitz, Jr. et al. | 92/23 X |

Primary Examiner—Richard T. Stouffer
Attorney, Agent, or Firm—Zarley, McKee, Thomte, Voorhees & Sease

[57] ABSTRACT

An apparatus for positively locking the wheels of a disc in transport and depth control positions. The disc harrow comprises a frame having disc sections thereto. A transversely extending axle is secured to the frame and has ground engaging wheels at the opposite ends thereof which control the discing depth and transport height. A hydraulic cylinder is secured at its forward base end to the frame and has the rearward end of its cylinder rod pivotally connected to the axle to raise and lower the wheels with respect to the frame. A spacer assembly slidably embraces the cylinder rod. A cylinder stroke lock assembly is pivotally connected, at its rearward end, to the rearward end of the cylinder rod for pivotal movement between a first horizontal position and a second upstanding position. The spacer assembly comprises a spacer tube and spacing washers. The spacing washers may be selectively moved with respect to the cylinder stroke lock assembly to permit depth control adjustment. The cylinder stroke lock assembly, when the spacer assembly is positioned rearwardly of the forward end of the lock assembly, permits the cylinder rod to freely slidably move inwardly into the hydraulic cylinder. The forward end of the cylinder stroke lock assembly is adapted to engage the spacer assembly to limit the inward movement of the cylinder rod into the cylinder when the cylinder stroke lock assembly is in its horizontal position.

9 Claims, 8 Drawing Figures

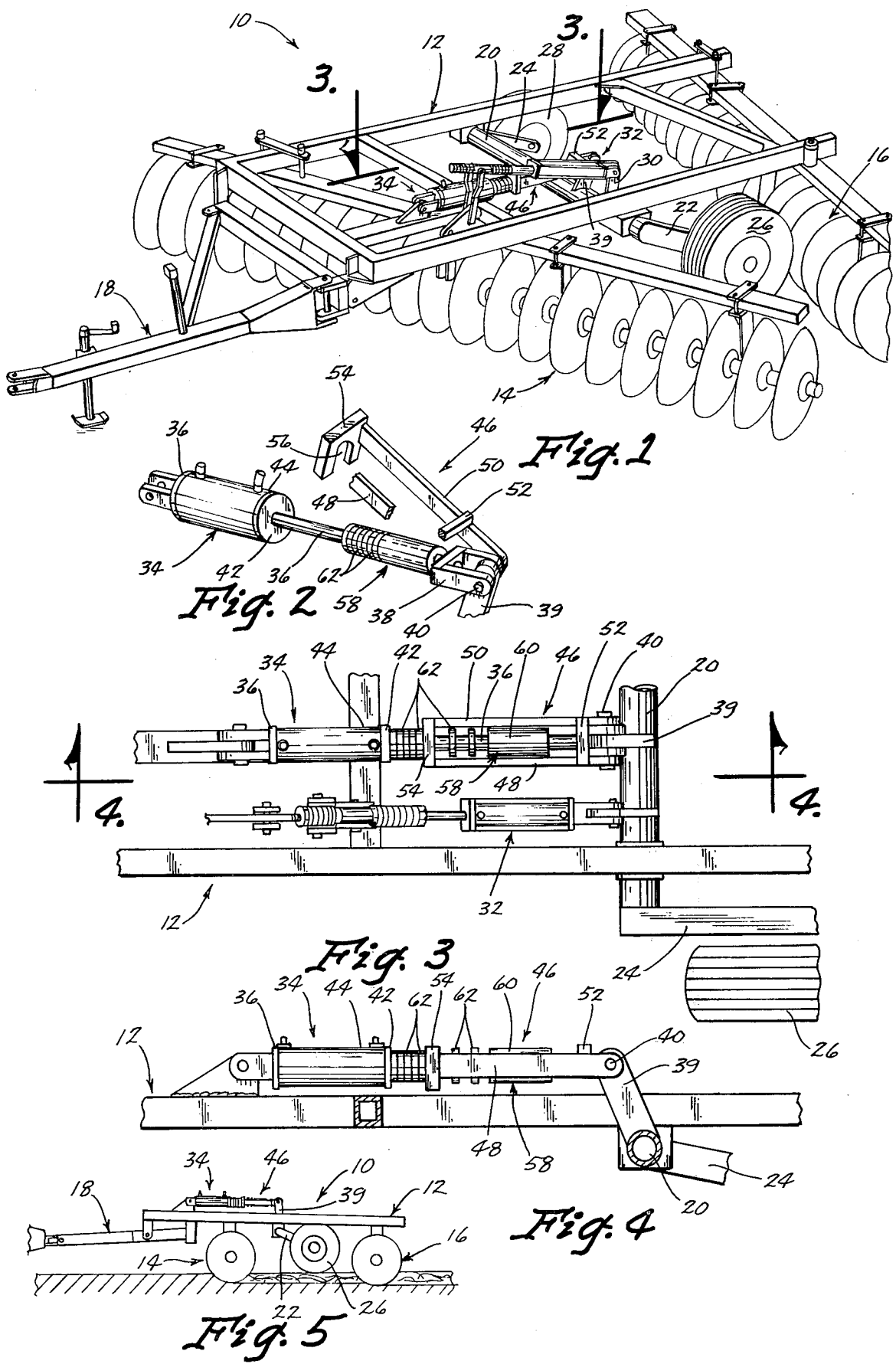

DISC HARROW WHEEL LOCK-DOWN WITH DEPTH CONTROL ADJUSTMENT STRUCTURE

BACKGROUND OF THE INVENTION

Modern implements such as disc harrows or the like ordinarily comprise a wheeled frame means having the earth working implements mounted thereon. Ordinarily, a hydraulic cylinder pivotally connects the support wheels and the frame means so that the wheels may be moved relative to the frame means to move the frame means between transport and field conditions.

In most conventional implements, the cylinder rod of the cylinder is in an extended condition when the wheels are in their transport position. Considerable stress and strain is placed on the hydraulic system and its components as the implement is moved from one location to another. Additionally, there has not been any convenient and safe means for positively locking the cylinder in the "open" position to enable a person to work beneath the implement when required. Certain types of clamps have been employed for attachment to the cylinder rod itself but these devices are frequently lost, damage the cylinder rod and impose undue stress on the cylinder body.

The ground engaging wheels are also used to control the discing depth and the prior implements do not have means for controlling the discing depth which may be conveniently changed.

Therefore, it is a principal object of the invention to provide an implement wheel lock-down assembly.

A still further object of the invention is to provide an implement wheel lock-down with depth adjustment control means.

A still further object of the invention is to provide a disc wheel lock-down with depth control adjustment means.

A still further object of the invention is to provide a cylinder stroke lock assembly.

A still further object of the invention is to provide a cylinder stroke lock assembly including depth control adjustment means.

A still further object of the invention is to provide a cylinder stroke lock assembly which does not impose undue strain on the cylinder.

A still further object of the invention is to provide a cylinder stroke lock assembly which is economical to manufacture and durable in use.

SUMMARY OF THE INVENTION

A disc harrow comprising a frame means having a wheel assembly operatively mounted thereon for transport and discing depth control. A hydraulic cylinder is pivotally connected at its forward base end to the frame means and has the rearward end of its cylinder rod pivotally connected to the wheel assembly for moving the wheel assembly between transport and field positions. A spacer tube assembly comprising a spacer tube and spacing washers slidably embraces the cylinder rod. A cylinder stroke lock assembly is pivotally connected at its rearward end to the rearward end of the cylinder rod for movement between a first horizontal position and a second upstanding position. When the cylinder stroke lock assembly is in its horizontal position, and the spacer tube assembly is positioned rearwardly of the forward end of the stroke lock assembly, the cylinder rod may slidably move inwardly into the cylinder body. When the cylinder stroke lock assembly is in its horizontal position, and the spacer tube assembly is positioned forwardly of the forward end of the stroke lock assembly, the forward end of the assembly engages the spacer tube to limit the movement of the cylinder rod into the cylinder. The spacing washers may be selectively positioned relative to the forward end of the cylinder stroke lock assembly to provide a convenient depth control adjustment means.

BRIEF DESCRIPTION OF THE DRAWINGS

FIG. 1 is a front perspective view of the disc harrow having the apparatus of this invention mounted thereon;

FIG. 2 is a partial perspective view of the cylinder stroke lock assembly and associated structure;

FIG. 3 is a top view as seen on lines 3—3 of FIG. 1;

FIG. 4 is a sectional view seen on lines 4—4 of FIG. 3 illustrating the lock assembly in an operative depth control position;

FIG. 5 is a side view of the disc harrow in a field position;

DESCRIPTION OF THE PREFERRED EMBODIMENT

Figure 6:
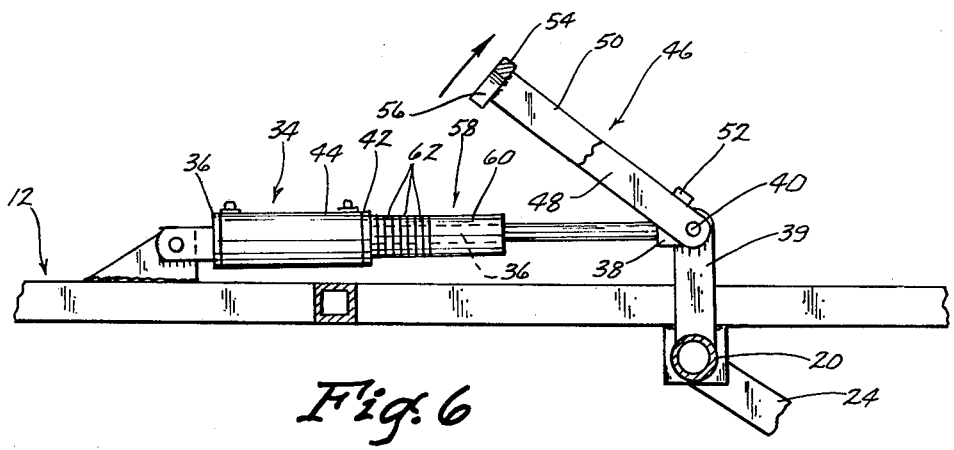
FIG. 6 is a sectional view similar to FIG. 4 except that the lock assembly has been pivoted to its inoperative position.

The numeral 10 refers generally to a disc harrow generally comprising a frame means 12 having front and rear disc sections 14 and 16 secured thereto in an imposing manner as illustrated in FIG. 1. A hitch means 18 is provided at the forward end of the disc harrow for connection to the prime mover.

A rotatable tube 20 is operatively rotatably mounted to the frame means 12 and has a pair of wheel support arms 22 and 24 extending downwardly from the opposite ends thereof. Wheels 26 and 28 are rotatably mounted on the lower ends of the wheel support arms 22 and 24 respectively. Arm 30 is secured to tube 20 and extends upwardly therefrom. The numeral 32 refers generally to a hydraulicly operated weight control apparatus which is disclosed in U.S. Pat. No. 3,809,165.

The numeral 34 refers to a hydraulic cylinder having its base end 36 pivotally connected to the frame means 12. Cylinder 34 is of the double-acting type and is provided with a cylinder rod 36 extending rearwardly therefrom. Rod 36 is provided with a clevis element 38 at its rearward or outer end which is pivotally connected to the upper end of the arm 39 by means of pin 40. Arm 39 is rigidly secured to tube 20 and extends upwardly therefrom as illustrated in the drawings. Cylinder 34 is provided with an impact plate 42 at its end 44 for a purpose to be described in more detail hereinafter.

Figure 7:
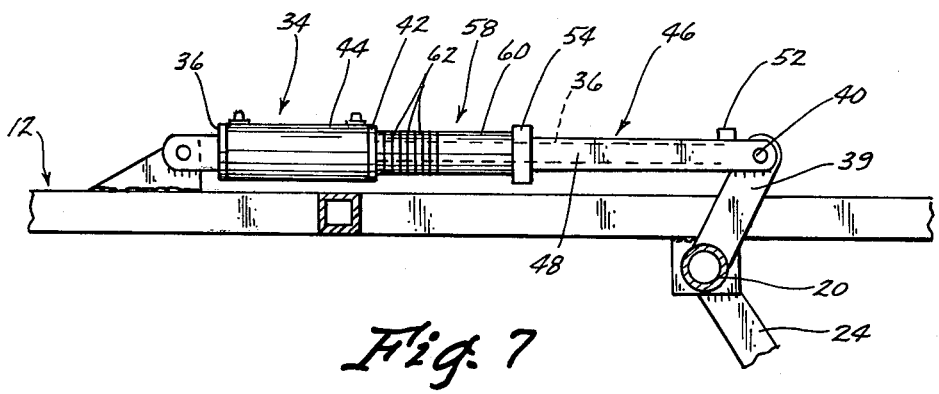
FIG. 7 is a sectional view similar to FIGS. 4 and 6 except that the lock assembly is in its operative transport position.
Figure 8:
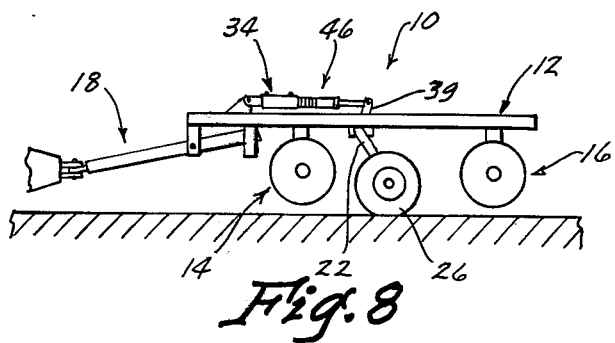
FIG. 8 is a side view of the disc harrow in a transport position.

A cylinder stroke lock assembly 46 is operatively pivotally connected to the rearward end of the rod 36 by means of the support arms 48 and 50 pivotally secured to the pin 40. Brace 52 is welded to arms 48 and 50 and extends therebetween adjacent the rearward ends thereof. Yoke 54 is welded to the forward ends of the arms 48 and 50 and is provided with an opening 56 formed therein extending upwardly thereinto as illustrated in the drawings. Assembly 46 may be pivoted from the upstanding position illustrated in FIGS. 2 and 6 to the horizontal position illustrated in FIGS. 3, 4 and 7.

Spacer assembly 58 slidably embraces rod 36 and is comprised of a spacer tube 50 and a plurality of spacing washers 62. As seen in the drawings, the spacing washers 62 are positioned adjacent the impact plate 42 with the tube 60 being positioned rearwardly thereof.

When it is necessary to transport the disc from one location to another, the cylinder 34 is actuated by the tractor hydraulic system to cause the rod 36 to be completely extended therefrom which causes the wheels to pivotally move downwardly into ground engagement thereby raising the frame means 12 upwardly from the ground. The assembly 46 is first pivoted upwardly to the upstanding position of FIG. 2. The washers 62 and tube 60 are then positioned adjacent the impact plate 42, forwardly of the assembly 46, and the assembly 46 pivotally moved downwardly from the upstanding position to the horizontal position so that opening 56 receives the rod 36. The hydraulic system is then operated to cause rod 36 to be slidably moved inwardly into the cylinder 34 until the yoke 54 engages the rearward end of the spacer tube 60 (FIG. 7) which limits any further inward movement of the rod. Thus, as the implement is moved from one field location to another, the hydraulic system does not absorb the shock which is normally created as the implement is moved over the road but the shocks are absorbed by the impact plate 42 and the strength of the cylinder itself and not on the seals, piston, etc. The cylinder stroke lock assembly 46 provides a positive lock for preventing the rod 36 from moving inwardly into the cylinder 34 so that the disc sections will not inadvertently lower as the implement is being moved from one location to another. Additionally, a person can work safely beneath the disc sections when the cylinder stroke lock assembly 46 is in the operative position since the apparatus provides a positive means for preventing the disc sections from moving downwardly.

When it is desired to employ the disc and to control the discing depth thereof, the hydraulic cylinder 34 is initially actuated to cause the rod 36 to be extended therefrom so that pressure between the yoke 54 and the tube 60 is removed. Assembly 46 is then pivotally moved upwardly sufficient to permit the tube 60 to be slidably moved rearwardly relative to the rod 36 so as to be positioned rearwardly of the yoke 54 (FIG. 3) when the assembly 46 is again moved to its horizontal position. After the tube 60 has been moved rearwardly on the rod 36, assembly 46 is pivoted to the horizontal position so that the yoke 54 will engage the spacer rings 62 as the cylinder rod 36 is moved inwardly into the cylinder 34 thereby limiting the inward movement of the cylinder rod 36 to control the discing depth. Any number of the spacing washers 62 may be positioned rearwardly of forwardly of the yoke 54 to permit a convenient and quick adjustment of the discing depth. In other words, if all of the spacing washers 62 are positioned between the yoke 54 and the impact plate 42, the discing depth will be less than if only a portion of the spacing washers 62 are so positioned.

Thus it can be seen that a novel disc wheel lock-down apparatus has been provided for positively locking the wheels in the transport position. It can also be seen that not only has a disc wheel lock-down apparatus been provided but a convenient depth control adjustment means has also been provided. It should be noted that while the invention has been described as being well suited for a disc harrow, it should be understood that the apparatus will also be ideally suited for all types of earth conditioning implements employing ground engaging wheels which are provided for transport and/or depth control purposes. Thus it can be seen that the apparatus accomplishes at least all of its stated objectives.

I claim:

1. In combination, an earth conditioning implement comprising a frame means having rearward and forward ends, earth conditioning means carried by said frame means, means on the forward end of said implement for connection to a prime mover, a wheel means operatively secured to said frame means and vertically movable with respect thereto between transport and field positions, said wheel means, when in its said transport position, causing said earth conditioning means to be moved upwardly out of earth engagement, said wheel means, when in its said field position, permitting said earth conditioning means to be in earth engagement, a hydraulic cylinder means comprising a cylinder body having a cylinder rod movably extending therefrom, said hydraulic cylinder being secured to said frame means and said wheel means for moving said wheel means between the said transport and field position, said cylinder rod being in an extended position when said wheel means is in its said transport position, and moveable lock means operatively pivotally connected to the outer end of said cylinder rod and movable between first and second positions, a spacer assembly selectively longitudinally movably mounted on said cylinder rod, said lock means being in operative engagement with said spacer assembly when said spacer assembly is adjacent said cylinder body and said lock means is in its first position to prevent said cylinder rod from slidably moving inwardly into said cylinder body, said lock means permitting said cylinder rod to move inwardly into said cylinder body when said spacer assembly is not positioned adjacent said cylinder body.

2. The combination of claim 1 wherein said lock means comprises an elongated yoke means having one end pivotally connected to the outer end of said cylinder rod and having a second end adapted to be in operative engagement with said spacer assembly to limit the said inward movement of said cylinder rod into said cylinder body.

3. The combination of claim 2 wherein said spacer assembly comprises a length adjustable means embracing said cylinder rod between the end of said cylinder body and the second end of said yoke means to provide a depth control adjustment means for said earth working implement.

4. The combination of claim 3 wherein said length adjustable means comprises an elongated hollow cylinder and a plurality of rings which may be selectively moved with respect to said cylinder rod and said second end of said yoke means.

5. The combination of claim 4 wherein said cylinder body has a base end which is pivotally connected to said frame means, said wheel means including a transversely extending rotatable member having at least a pair of wheel support arms extending transversely therefrom, a wheel rotatably mounted on each of said wheel support arms, the outer end of said cylinder rod being operatively pivotally secured to said rotatable member whereby slidable extension of said cylinder rod with respect to said cylinder body causes said rotatable member to be rotated thereby causing the wheels to be lowered with respect to said frame means.

6. The combination of claim 5 wherein said yoke means comprises first and second elongated members having one end thereof operatively pivotally secured to the outer end of said cylinder rod, an abutment means secured to the other end of said elongated members and having an opening formed therein adapted to receive said cylinder rod when said yoke means is in said first position so that said abutment means will operatively engage the said spacer assembly.

7. The combination of claim 6 wherein said hollow cylinder and rings are positioned between said abutment means and the end of said cylinder body when said wheel means is in said transport position.

8. The combination of claim 1 wherein said earth conditioning implement comprises a disc harrow.

9. In combination,
a frame means having rearward and forward ends,
means on the forward end of said frame means for connection to a prime mover,
a wheel means operatively secured to said frame means and vertically movable with respect thereto so that said frame means may be moved between first and second positions,
said wheel means, when in its said first position, causing said frame means to be moved upwardly relative to the ground,
said wheel means, when in its said second position, permitting said frame means to move downwardly towards the ground,
a hydraulic cylinder comprising a cylinder body having a cylinder rod movably extending therefrom,
said hydraulic cylinder being secured to said frame means and said wheel means for moving said wheel means between the said first and second positions,
said cylinder rod being in an extended position when said wheel means is in its said first position,
and movable lock means operatively pivotally connected to the outer end of said cylinder rod and movable between first and second positions,
a spacer assembly selectively longitudinally movably mounted on said cylinder rod,
said lock means being in operative engagement with said spacer assembly when said spacer assembly is adjacent said cylinder body and said lock means is in its first position to prevent said cylinder rod from slidably moving inwardly into said cylinder body,
said lock means permitting said cylinder rod to move inwardly into said cylinder body when said spacer assembly is not positioned adjacent said cylinder body.

* * * * *